United States Patent [19]
Tognazzini

[11] Patent Number: 5,859,629
[45] Date of Patent: Jan. 12, 1999

[54] LINEAR TOUCH INPUT DEVICE

[75] Inventor: Bruce Tognazzini, Woodside, Calif.

[73] Assignee: Sun Microsystems, Inc., Palo Alto, Calif.

[21] Appl. No.: 674,491

[22] Filed: Jul. 1, 1996

[51] Int. Cl.$^6$ .................................................. G09G 5/00
[52] U.S. Cl. ........................................ 345/173; 345/168
[58] Field of Search .................... 345/173, 156, 345/157, 159, 168, 169, 172, 145, 146; 178/18, 19; 341/22, 23

[56] References Cited

U.S. PATENT DOCUMENTS 4,458,238  7/1984  Learn .
5,598,527  1/1997  Debrus et al. ........................ 345/168

*Primary Examiner*—Xiao Wu
*Attorney, Agent, or Firm*—McDermott, Will & Emery

[57] ABSTRACT

A keyboard contains an input device comprising a linear strip of sensitive material the approximate width of the human finger integrated into the left or right side of the keyboard. The strip is linearly sensitive in only one direction and not to any other direction, such as from left to right. A user operates the device by touching it with his or her finger and varies the input by changing the position along the strip and the pressure of his or her finger.

3 Claims, 3 Drawing Sheets

LINEAR TOUCH INPUT DEVICE

BACKGROUND OF THE INVENTION

1. Field of the Invention

The invention relates generally to user input devices. More particularly, the present invention relates to a simple computer touch input device providing input information corresponding to position and pressure.

2. Description of the Related Art

Conventional input devices are inefficient and require a user to utilize skill and dexterity in order to operate. In particular, keyboards require a modicum of typing skills and fine-motor devices such as miniature trackballs and the IBM trackpoint (pencil-eraser-look-alike) device are difficult to use and may be impossible or uncomfortable for people with slight disabilities.

Even simple devices tend to have disadvantages. For example, a mouse can be used to point to and click on items displayed on a screen. The mouse is typically restricted to operate merely as a pointing device, with the user moving the mouse with the right hand and either doing nothing with the left hand or pressing a small number of modifier keys. The non-dominant hand (typically the left hand) is underutilized during graphical interaction with the display of a computer screen. Unfortunately, using two mice simultaneously requires an unusually high level of both manual and cognitive dexterity.

Other pointing devices, such as pressure-sensitive touch tablets, also require a certain degree of manual and cognitive dexterity and can be disadvantageous for the further reason that they are bulky and relatively expensive. In particular, three-dimensional input devices, such as flying mouses which are intended to be lifted off of the table to indicate a position in the Z-axis are difficult to use.

Consequently, there is a need for an input device which is easier for users to use than a mouse, has a predictable and close location, and is easier to manipulate, especially when inputting three-dimension position data.

SUMMARY OF THE INVENTION

The present invention provides an input device which allows information to be input to a device through a simple operation. A key feature of the input device is that a user operates the device by touching it with his or her finger and varies the input by changing the location and the pressure of his or her finger.

In accordance with a preferred embodiment of the invention, the input device is comprised of a strip of pressure sensitive material of approximately the width of a human finger. The strip is sensitive to detect contact in only one direction and not in any other direction, such as from left to right. The strip is preferably made an integral part of the left and/or right side of a keyboard. It is thus easy to access and manipulate due to its predictable location and its compact and simple design.

The advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in the same or other fields, which are within the scope of the invention as disclosed and claimed herein and with respect to which the invention could be of significant utility.

NOTATION AND NOMENCLATURES

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose, such as a graphics workstation, or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENTS

Figure 1:
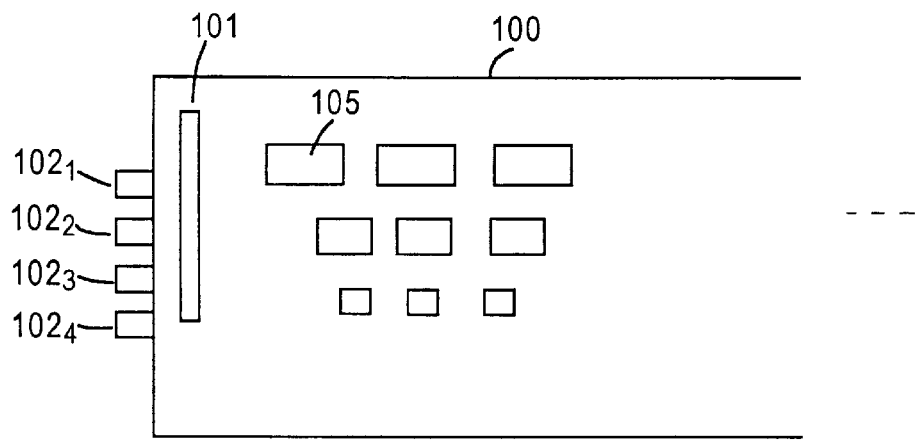
FIG. 1 is an illustrative view of part of the top of a keyboard incorporating a linear touch input device in accordance with a first embodiment of the present invention.

One embodiment of the linear touch input device in accordance with the invention will now be described with reference to FIG. 1. As shown in FIG. 1, a straight strip of sensitive material 101 is mounted on the left side of a keyboard 100 roughly parallel to the left edge of keyboard 100. Keyboard 100 may be physically separated from, yet connected to, a desktop personal computer or workstation or it may be an integrated part of a system such as a portable computer. The strip of sensitive material 101 preferably has a width of about one centimeter (approximately the width of a human finger) and a length of about four centimeters. Contact and pressure sensitive materials suitable for implementing the strip are well known in the art. Strip 101 is located a short distance from the left edge of keyboard 100 so as to allow the natural placement of a user's thumb thereon when the user's hand is on the left end of keyboard 100, thus affording the user easy access. Strip 101 extends in the vertical direction, with no perpendicular left to right movement.

In its simplest implementation, the input device detects only the vertical position of a finger on strip 101 and interface circuitry converts the vertical position into a signal representing a number corresponding to the vertical position, which signal is then supplied to an information processing system, such as a computer or workstation. In a more sophisticated implementation, the input device also detects the user's level of pressure on strip 101 in a manner known in the art, thereby adding an additional dimension to the input data without requiring the user to change positions to activate another sensor.

As shown in FIG. 1, the first embodiment of the linear touch input device also has a number (preferably four) of keys $102_1$ to $102_N$ at fixed locations on the left side of keyboard 100, in a location enabling the user to naturally slide his or her thumb up and down strip 101 while pressing any combination of the keys $102_1$ to $102_N$. The keys are preferably used to enable the user to modify an attribute of the output of the linear touch input device or another input device, such as a mouse, while simultaneously using the linear touch input device. The effect of the keys may be fixed and determined by hardware within the linear touch input device itself or the effect of the keys may be variably determined by software within the information processing system to which the linear touch input device is connected. Specific examples of the possible uses of keys $102_1$ to $102_N$ in computer or workstation applications are provided and described in further detail below.

Figure 2:
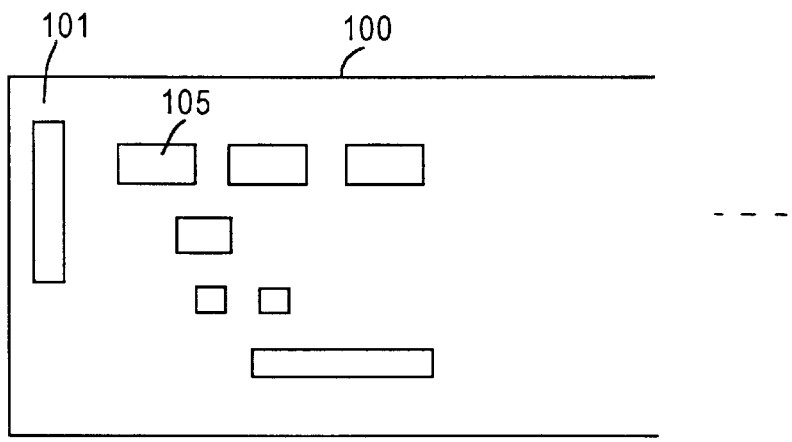
FIG. 2 is an illustrative view of part of the top of a keyboard incorporating a linear touch input device in accordance with a second embodiment of the present invention.

As shown in FIG. 2, a second embodiment of the invention also has a strip of sensitive material 101 mounted on the left side of a keyboard 100 roughly parallel to the left edge of keyboard 100. Again, the strip of sensitive material 101 preferably has a width of about one centimeter (approximately the width of a human finger) and a length of about four centimeters and is linear in the vertical direction, with no perpendicular left to right movement. As in the first embodiment, the input device may either detect only the vertical position of a finger on strip 101 or it may also detect the user's level of pressure on strip 101. In either case, the device translates the position and/or pressure into a number (s) which is then supplied to an information processing system such as a computer or workstation.

Figure 3:
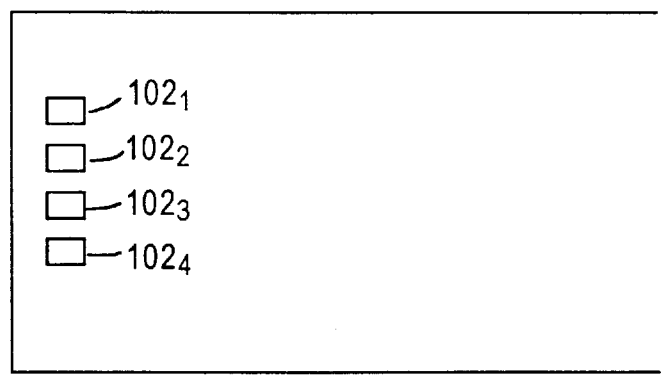
FIG. 3 is a view of part of the bottom of a keyboard incorporating a linear touch input device in accordance with a second embodiment of the present invention.

However, as shown in FIG. 3, the second embodiment differs from the first embodiment insofar as the plurality of keys $102_1$ to $102_N$ (N preferably equal to four) are at fixed locations on the bottom of keyboard 100 rather than on the side. Strip 101 is again located a short distance from the left edge of keyboard 100 so as to allow the natural placement of a user's thumb thereon. But since, in the second embodiment, the user will grasp or cup the left end of keyboard 100, the strip 101 is preferably located slightly higher and closer to the left edge of keyboard 100 in the second embodiment than in the first embodiment.

Figure 4:
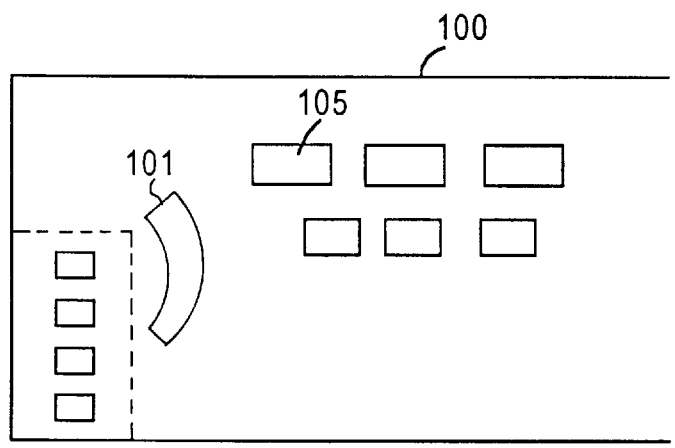
FIG. 4 is an illustrative cut-away view of a keyboard incorporating a linear touch input device in accordance with a third embodiment of the present invention.

As shown in FIG. 4, a third embodiment is substantially similar to the second embodiment except that strip 101 is formed in a arc shape rather than in a straight line. The position and radius of curvature of strip 101 is such that a user's thumb falls naturally over the entire length of the strip.

Figure 5:
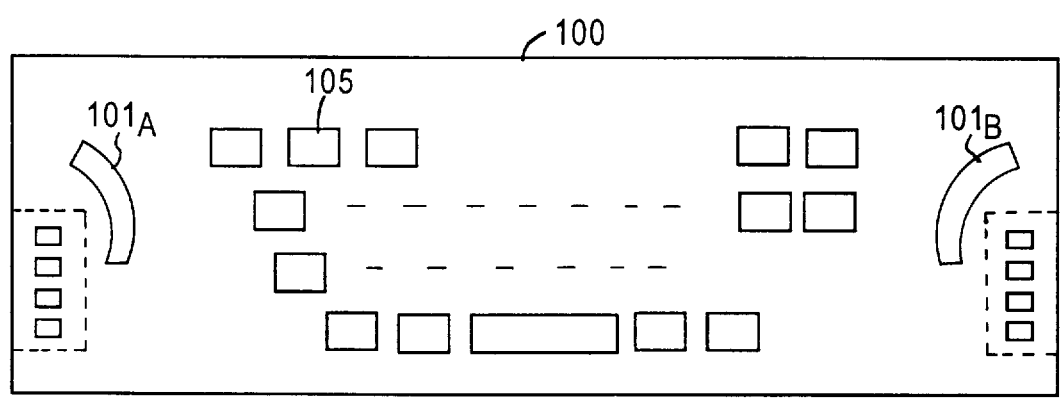
FIG. 5 is a view of the simultaneous implementation of two linear touch input devices in a keyboard in accordance with the present invention.

As shown in FIG. 5, two linear touch input devices $101_A$ and $101_B$ may be implemented simultaneously on the left and right sides of the keyboard 100. The two input devices, flanking either side of the keyboard, may replace the mouse or other conventional pointing device entirely. Such an integrated keyboard and pointing device offers the advantage of a gross-motor device while being compact and mechanically simple.

Figure 6:
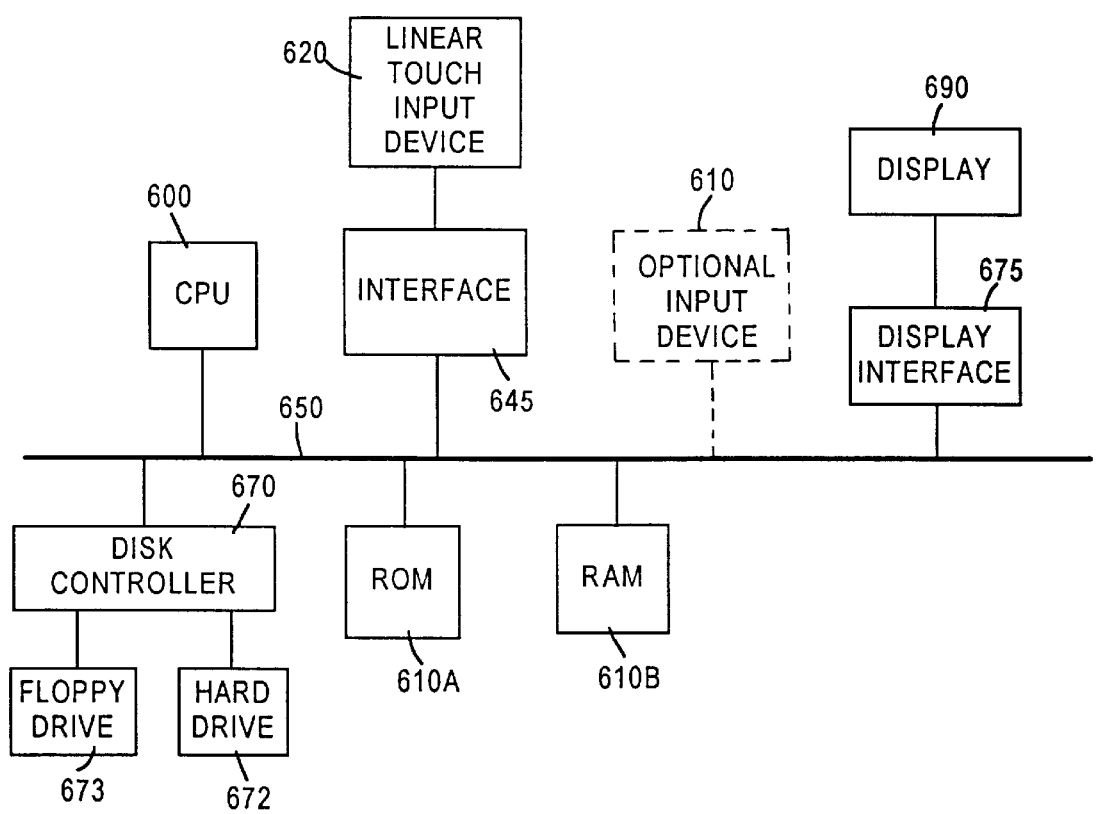
FIG. 6 is a block diagram of an information processing system connected with a linear touch input device according to the present invention.

The linear touch input devices are preferably used with an information processing system such as a computer shown in FIG. 4. As shown in FIG. 6, the computer has a central processing unit (CPU) 600 operatively connected to memory devices 610A and 610B, namely read-only memory (ROM) 610a and random access memory (RAM) 610b. ROM memory 610a typically stores BIOS and operating system like information. Programming which instructs the CPU 600 to operate in accordance with the present invention as will be described in detail below may be stored in ROM or RAM. Data and information received or generated by the CPU 600 can be preferably stored in RAM 610b. Memory devices such as hard drive 672 or floppy disk drive 673, SRAM, DRAM, etc., could be utilized in addition, as is well understood by those of skill in the art. The CPU 600 is also operatively connected to a linear touch input device 420 as described above. Optionally, the CPU 600 may also be connected to a key pad, dial, mouse or virtually any other device 610 which would facilitate the input of data, of the type described below, by a user to the CPU 600.

It is to be understood that the elements of the system must be programmed to perform a variety of different operations or applications utilizing the input data. In particular, CPU 600 contains driver software for the linear touch input device or operates in accordance with such driver software contained within ROM or PAM of the computer. The CPU 600 also may process the input data received from the linear touch input device according to applications programming contained within the computer. Data and programming information used to implement the invention may be carried in a memory medium such as a floppy disk and loaded into a computer for execution.

Depending on the applications programmed into the computer, the linear touch input device could be used as a speed control, volume control, scaling control (including, but not limited to, scaling control of a second pointing device), etc. For example, users could scroll up and down in a text document using the linear touch input device while simultaneously seeking the word they were looking for using the keyboard or other input device. Of course, the uses of the linear touch input device are not restricted to those specifically described in this application.

As a preferred application, a linear touch input device in accordance with the invention is used in order to easily perform two-handed three-dimensional input, simultaneously using the mouse for conventional X-Y positioning and the linear device for movement in the Z axis.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed:

1. A method of providing user controlled inputs to a computer, the method comprising the steps of:

contacting a strip of touch sensitive material by hand;

in response to said contact, converting the position of said contact into a data signal indicating the position of said contact along the length of said strip;

activating one or more touch keys substantially simultaneously with contacting said strip of touch sensitive material to change the meaning of said data signal; and outputting said data signal to a bus of said computer, wherein selection of said touch keys modifies a granularity of movement controlled by said strip of touch sensitive material.

2. A method according to claim 1, wherein said step of transposing includes transposing the pressure of said contact and wherein said data signal also indicates the pressure of said contact.

3. A method according to claim 1, wherein said touch keys are selected by the fingers of a hand while said strip of touch sensitive material is contacted by the thumb of the hand.

* * * * *